K. A. KENDRICK.
DIFFERENTIAL MECHANISM.
APPLICATION FILED DEC. 2, 1910.

1,049,869.

Patented Jan. 7, 1913.

2 SHEETS—SHEET 1.

Witnesses
O. B. Baenziger
J. F. Howlett

Inventor
Karl. A. Kendrick
T. S. Wheeler, Attorney.

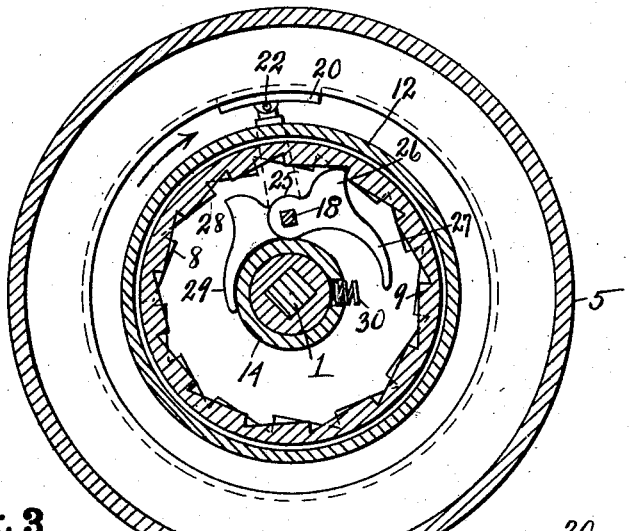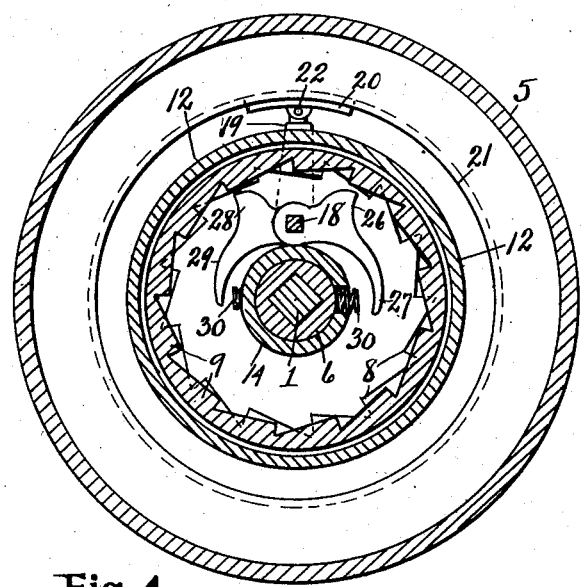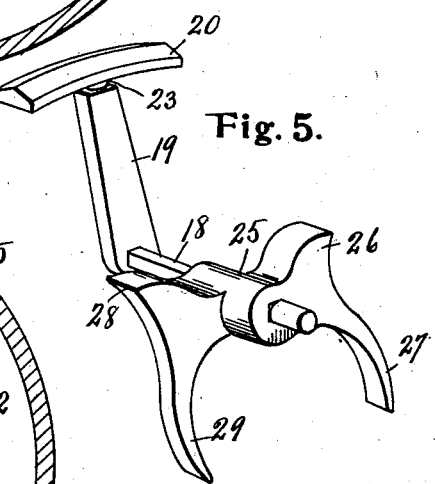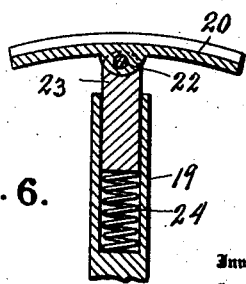

UNITED STATES PATENT OFFICE.

KARL A. KENDRICK, OF DETROIT, MICHIGAN, ASSIGNOR OF ONE-HALF TO HARRISON GEER, OF DETROIT, MICHIGAN.

DIFFERENTIAL MECHANISM.

1,049,869.  Specification of Letters Patent. Patented Jan. 7, 1913.

Application filed December 2, 1910. Serial No. 595,210.

*To all whom it may concern:*

Be it known that I, KARL A. KENDRICK, a citizen of the United States, residing at Detroit, in the county of Wayne, State of Michigan, have invented certain new and useful Improvements in Differential Mechanism; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to differential mechanism especially designed for use in the propulsion of motor vehicles, but adaptable for other purposes, and consists in the construction and arrangement of parts hereinafter more fully set forth and pointed out particularly in the claims.

The objects of the invention are to provide simple and efficient means in connection with a divided axle for driving the axle sections positively at the same rate of speed and allowing either section to overrun or turn at a higher rate of speed than the driving member; to allow each axle section to re-engage with its driving member when the speed thereof falls to that at which its companion part is being driven; to allow both axle sections to disengage themselves from the driving power when coasting and re-engage when they have ceased to run faster than the driving member; to allow a complete disengagement of the axle parts from the driving member when at rest and to enable both sections of the axle to be turned freely in either direction when the wheels are off of the ground.

The above objects are attained by the mechanism illustrated in the accompanying drawings, in which:—

Figure 1:
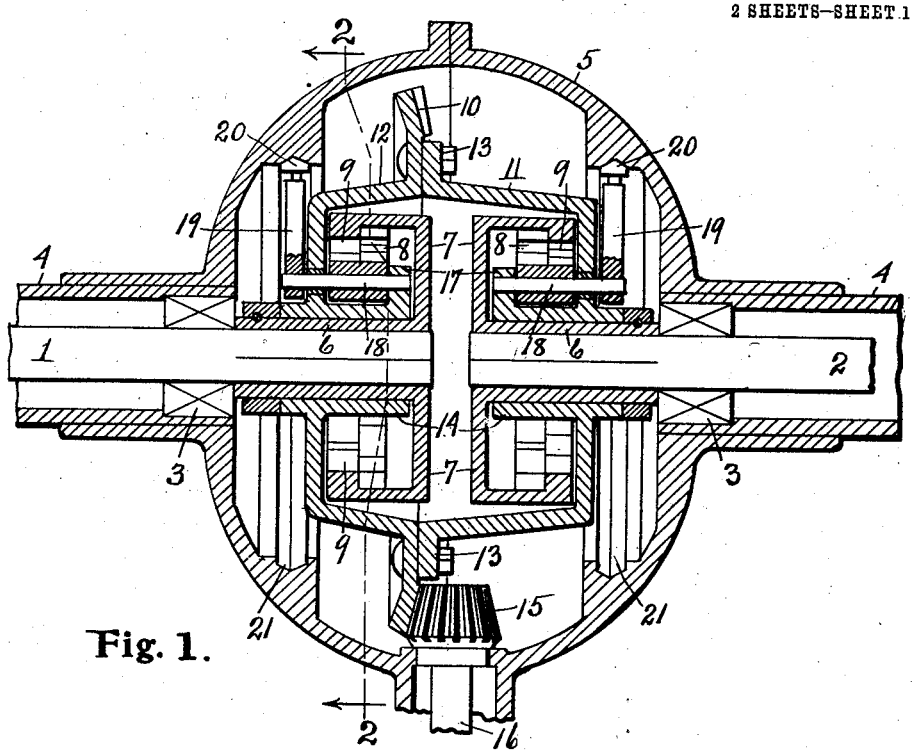
Figure 2:
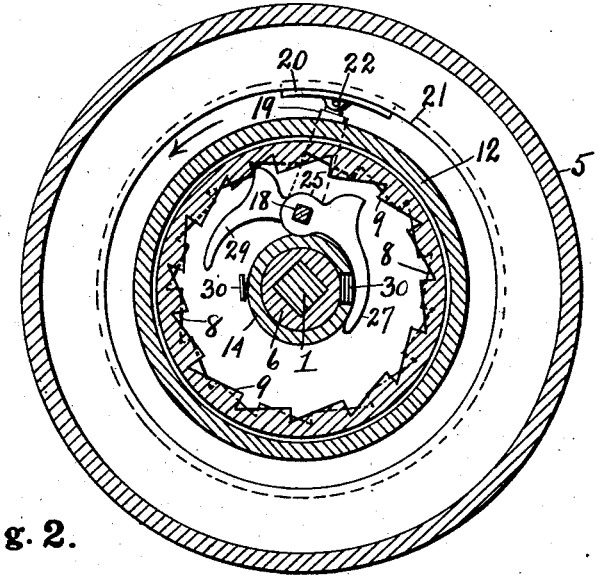

Figure 1 is a longitudinal sectional view through the case which forms a housing for the operative parts and for the divided axle, and through the mechanism therein, with the exception of the axle sections and driving shaft and pinion which appear in elevation, portions of said shaft and axles, and also of the case being broken away. Fig. 2 is a transverse section through the case and mechanism, as on line 2—2 of Fig. 1, the parts being in position to drive the car ahead. Fig. 3 is a similar view, showing the parts in position to effect a reverse drive. Fig. 4 is a similar section, showing the driving pawls which are employed to effect a connection between the sections of the axle and the driving gear in the neutral position in which the axle is free to revolve in either direction without turning the driving gear and shaft. Fig. 5 is a perspective view of the duplex or double pawl employed in connection with each axle section showing the friction shoe carried by an arm on the shaft of said pawls through the medium of which said shaft is actuated to effect an engagement between said pawls and their respective ratchets. Fig. 6 is an enlarged sectional view through said arm and shoe, showing the stem of the shoe seated in said arm against a compressible spring, whereby said shoe is yieldingly held with tension against its track in the case.

The axle which is adapted to carry the traction wheels, not shown, is of the divided type, and consists of the sections 1 and 2 disposed in axial alinement and journaled in suitable bearings 3 in the tubular axle case 4. The case 5 which contains the driving mechanism is somewhat globular in form and into which the ends of the axle sections 1 and 2 project. The inner end of each of the axle sections is squared, and mounted thereon is a sleeve 6 which embraces said axle to rotate therewith, each sleeve carrying a drum 7. The drums 7 are hollow and upon the inner wall of each concentric with the axis of the shaft section to which it relates, is formed a double row of ratchet teeth 8 and 9, respectively, whose engaging faces extend in opposite directions; that is to say, the engaging faces of the teeth of one row stand in a direction opposite to that of the teeth in the other row. While the rows of ratchet teeth 8 and 9 in each of the drums face in opposite directions, the teeth of the corresponding ratchets in both drums face in the same direction; that is to say, the teeth 8 in each drum which are the teeth through which the forward drive is effected, have their engaging faces standing in the same direction, and the teeth 9 in the two drums which are the reversing teeth, have their engaging faces standing in the same direction. The driving member consists of a hollow, beveled gear 10, comprising the parts or halves 11 and 12 which are bolted together at 13. The parts of said gear have hub members 14 which turn upon the sleeves 6 of the drums 7, respectively, an arrangement which causes said drums and the mechanism therein to become wholly confined within said gear. Meshing with said gear 10 is a beveled pinion 15 mounted on the end of the driving shaft 16 driven by any suitable motor, not shown. Formed upon the inner end of each of the hub members 14 is a projecting ear 17 in which is journaled the inner end of a rock shaft 18, the outer end of said shaft passing through and being journaled in the outer wall of the hollow gear, as clearly shown in Fig. 1.

On the projecting end of each of the shafts 18 is a fixed arm 19 carrying at its outer end a friction shoe 20 adapted to travel in a V track 21 formed in the wall of the case concentric with the axis of the main shaft. The shoes 20 are each pivoted, as shown at 22 in Fig. 6, to a stem 23 which slides in a socket in the arm 19 and is constantly urged outwardly by a compressible spring 24 confined between the end of said socket and the inner end of said stem. Fixed to the rock shaft 18 to turn or swing therewith is a duplex pawl 25, comprising a driving pawl 26 with a curved tail portion 27, and a driving pawl 28 with a curved tail portion 29. The pawls face in opposite directions and are offset to cause them to stand out of transverse alinement to enable the pawl 26 to engage the ratchet teeth 9 and the pawl 28 to engage the ratchet teeth 8, when the shaft 18 is rocked in a direction to carry the engaging points of said pawls into contact with the teeth of their respective racks.

In the operation of this device, when the driving pinion 15 is turned to cause a rotation of the gear 10 in the direction indicated by the arrow in Fig. 2, the frictional engagement of the shoes 20 with the tracks 21 will cause said shoes to lag and effect a rocking of the shafts 18 through the medium of the arms 19 carrying said shoes and mounted on said shafts. As the shafts 18 are rocked the pawls 28 of the duplex pawls are swung outwardly into engagement with the ratchets 8, thereby locking the drums 7 to the gear wheel 10 so as to cause them to turn therewith, said drums imparting a like rotation to the shaft sections 1 and 2, respectively, on which they are mounted, whereby the traction wheels, not shown, mounted on said shaft sections are positively driven at an equal rate of speed in the same direction. By this arrangement the traction wheels of each of the shaft sections are free to overrun when rounding a curve on the outside, at which time the drum 7 carried on said shaft section will revolve faster than the gear 10 which carries the rock shafts and driving pawls, the ratchet teeth in said accelerated drum slipping idly past the engaging point of the driving pawl to accommodate said accelerated movement. When the accelerated shaft section returns to the speed of its companion part, the pawl will again engage its ratchet and the load will again be distributed between the two traction wheels. It will be noted that when one wheel is running ahead of its driving power, the other is carrying the load, so that one wheel is being positively driven at all times. It will further be noted that should the inside wheel which normally carries the load when rounding a curve slip or lose traction sufficiently to cause it to spin or revolve at a rate of speed faster than the outside wheel, the load will be instantly shifted to the outside wheel which may have a firm traction grip on the road, thereby preventing the vehicle losing traction under any circumstances.

To reverse the direction of rotation of the divided axle, gear wheel 10 is turned in the opposite direction, thereby causing the friction shoes to actuate the rock shafts 18 through the arms 19 to throw the pawls 26 into engagement with the ratchet teeth 9 of the drums 7 and carry the pawls 28 away from engagement with the ratchet teeth 8, thereby causing the gear 10 to become locked to the drums 7 to drive the shaft sections in the direction indicated by the arrow in Fig. 3. When the pawls are in engagement with their respective rack teeth to drive the shaft sections forward or in a reverse direction, they are arrested when full engagement with the rack teeth has been attained, by the tail portions thereof engaging the hub members 14 of the gear 10. To cushion the contact of the tail portions of said pawls with said hub members, they are provided with compressible springs 30 which have such resisting power as to prevent a sudden rigid arresting of the pawls when swinging into contact with their ratchet teeth, thereby preventing undue shock and jar at the instant of starting the load, and allowing the pawls to yieldingly and more gradually assume the condition of complete engagement with their respective ratchets. In the neutral position shown in Fig. 4, both pawls are disengaged from their respective ratchets whereby the traction wheels when lifted from the ground may be freely turned in either direction without turning the gear 10. When coasting, the traction wheels may freely overrun the driving gear, and in fact the motor may be stopped entirely and the car allowed to descend a grade by its own momentum, a condition in which the motor and all the driving parts are disconnected from the traction wheels. In this connection, attention is called to the fact that when coasting, or when either wheel is running ahead of the driving gear, there is no danger whatever of shifting the parts so as to engage the driving elements in the position for reverse drive, a result made possible because of the fact that when the ratchet-carrying drums are revolving faster than the gear 10, they are entirely disconnected from said gear and the driving parts, and cannot by any velocity which they may attain, effect a reëngagement of the driving elements therewith.

Having thus fully set forth my invention, what I claim as new and desire to secure by Letters Patent, is:—

1. Differential mechanism comprising an axle, a drum fixed thereon, two rows of ratchet teeth on said drum facing in opposite directions, a duplex pawl adapted to successively engage said teeth, a rotary driving member, a shaft journaled in the driving member carrying said pawl, a non-rotary member, and an arm connected to the shaft of said pawl and having frictional engagement at its outer end with said non-rotary member.

2. Differential mechanism comprising an axle, a drum fixed thereon, two rows of ratchet teeth on said drum facing in opposite directions, a duplex pawl adapted to successively engage said teeth, a rotary driving member carrying said pawl, a non-rotary member, actuatable means connected to said pawl and having frictional engagement with said non-rotary member, and a yieldable resistance for arresting said pawls when moving into engagement with their ratchets.

In testimony whereof, I sign this specification in the presence of two witnesses.

KARL A. KENDRICK.

Witnesses:
　　CLARENCE E. DAY,
　　IDA GERTRUDE HOWLETT.

Copies of this patent may be obtained for five cents each, by addressing the "Commissioner of Patents. Washington, D. C."